(No Model.)

H. F. JACOBS.
COW TAIL HOLDER.

No. 319,263.   Patented June 2, 1885.

WITNESSES.
J. M. Hartnett
B. W. Williams

INVENTOR.
Herman F. Jacobs.
By his Atty.
Henry W. Williams

UNITED STATES PATENT OFFICE.

HERMAN F. JACOBS, OF WESTON, MASSACHUSETTS.

COW-TAIL HOLDER.

SPECIFICATION forming part of Letters Patent No. 319,263, dated June 2, 1885.

Application filed January 19, 1885. (No model.)

*To all whom it may concern:*

Be it known that I, HERMAN F. JACOBS, of Weston, in the county of Middlesex and State of Massachusetts, have invented a new and useful Improvement in Cow-Tail Holders, of which the following is a specification.

This is a device adapted to be applied to one of the hind legs of a cow, and to extend therefrom to the tail of the animal, whereby the same is confined and prevented from annoying the operator during the milking process.

Figure 1:
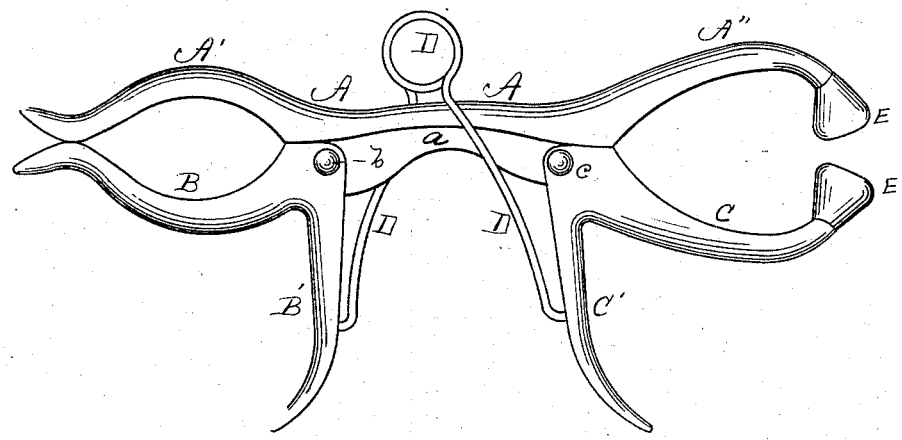
Figure 2:
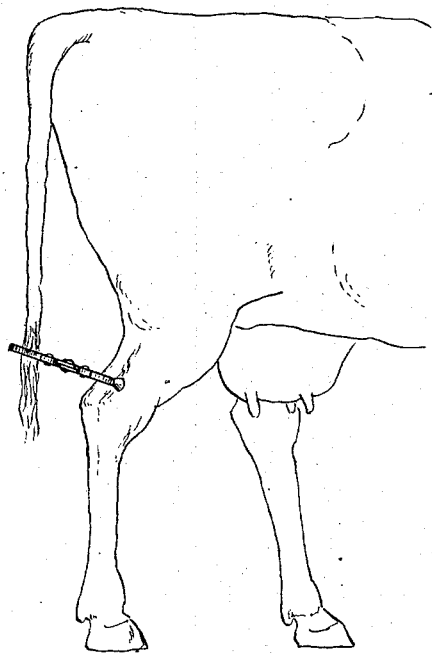

In the accompanying drawings, Figure 1 is a plan view of my device. Fig. 2 is a view of the same in position on the animal.

A is a stationary piece provided with stationary arms or jaws A' and A'', curved in the shape shown. The piece A is provided with a step or ledge, $a$, to which is pivoted at $b$ an elbow-lever, one arm of which, B, is a movable jaw corresponding to the jaw A, and the other arm of which, B', is a handle.

Pivoted at $c$ to the step $a$ is an elbow-lever, one arm of which, C, is a movable jaw corresponding in shape to the jaw A'', and the other arm of which, C', is a handle. A spring, D, holds the handles B' and C' normally apart and the jaws together. The ends of the handles are preferably bent away from each other to facilitate the operation of the same. The jaws A'' and C terminate at their ends in bulbs or enlargements E E, and the jaws A' and B are bent apart at their outer ends.

In operation the jaws A'' and C are placed upon opposite sides of one of the hind legs of the animal, a little above the hough and inside or beyond the cord, as shown in Fig. 2. At this point the leg is very thin, and the jaws can rest without pressing hard enough to render the animal restless. The rear portions of said jaws rest on the leg and prevent the device from dropping, and they are preferably made of such shape as not to allow the ends E to quite meet when the device is not in use, so that when it is in use there will not be undue pressure upon the parts. The tail is held by the jaws A' and B, and may wholly pass through the opening produced by their shape, or may be clamped by their outer ends, as desired.

The device is easily applied and removed by simply pressing the handles B' and C' together.

I am aware that it is not new to provide two pairs of jaws and springs connecting the same, and that bulbs at the ends of jaws have been used in cow-tail holders. In my improvement I provide two pairs of jaws, one of each pair being integral with the corresponding one of the other pair, and handles which allow the jaws to be used without reaching so far as is required in a cow-tail holder whose pairs of jaws are connected by springs, which also serve as handles.

Having thus fully described my invention, what I claim, and desire to secure by Letters Patent, is—

An improved cow-tail holder consisting of the stationary piece A, provided with jaws A' A'' and ledge $a$, all being integral, the movable jaws B C, pivoted at $b$ $c$ to the ledge $a$, the handles B' C', made integral with the movable jaws and extending at substantially right angles therefrom, and the spring D, of substantially the shape shown, and whose opposite ends are secured to said handles, whereby the same are held normally apart, all constructed and arranged substantially as and for the purpose set forth.

HERMAN F. JACOBS.

Witnesses:
HENRY W. WILLIAMS,
J. M. HARTNETT.